United States Patent Office 2,838,940
Patented June 17, 1958

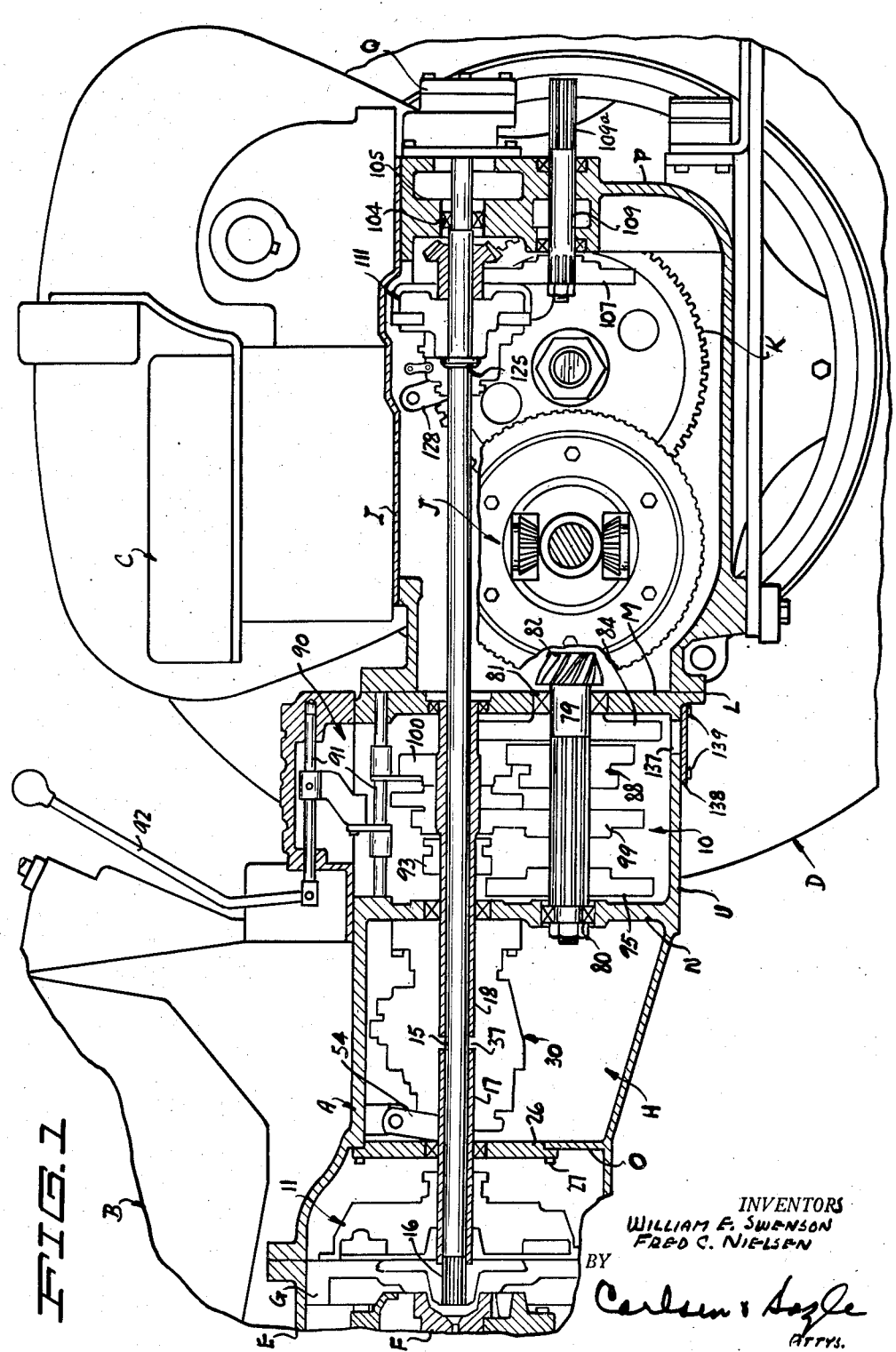

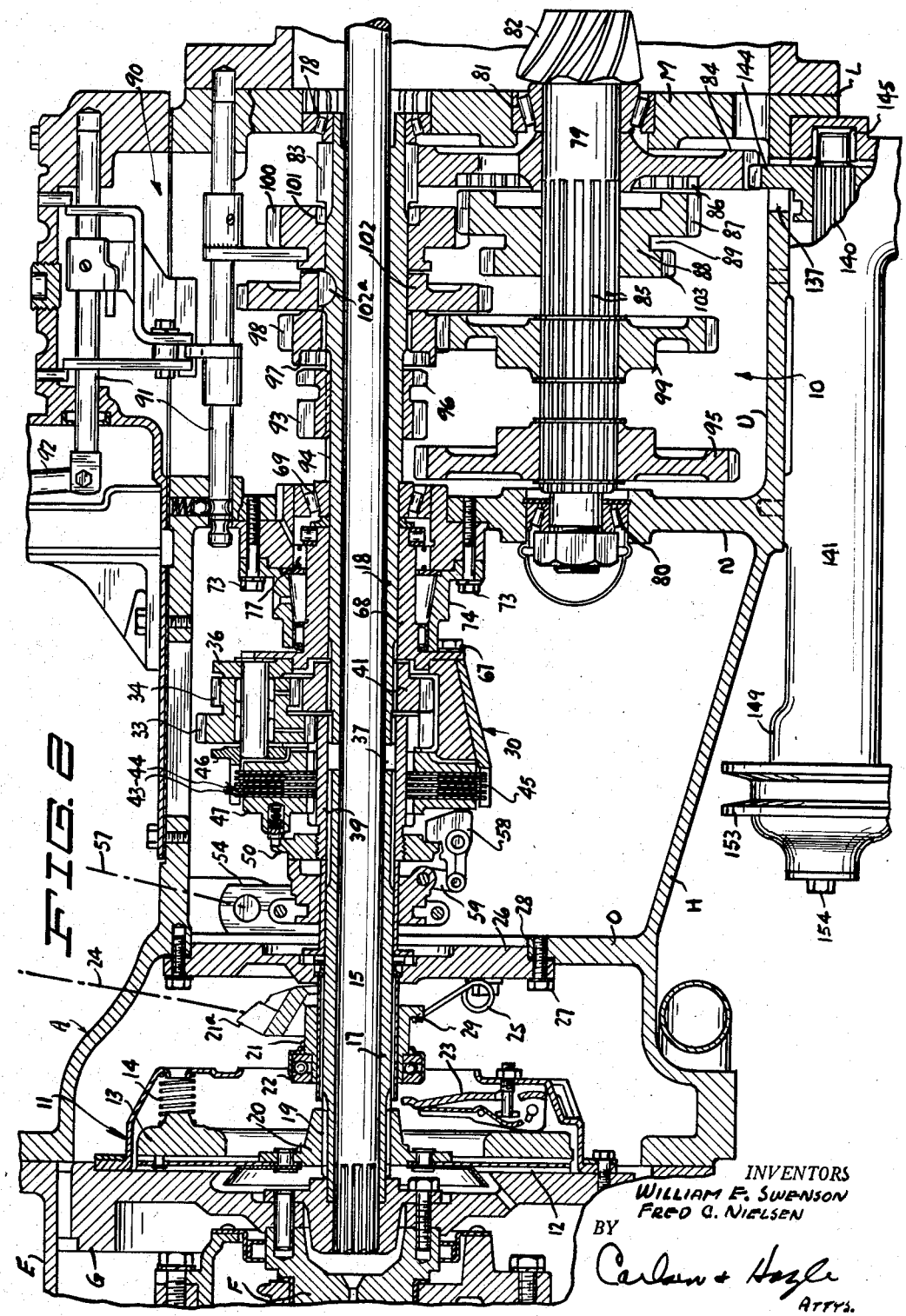

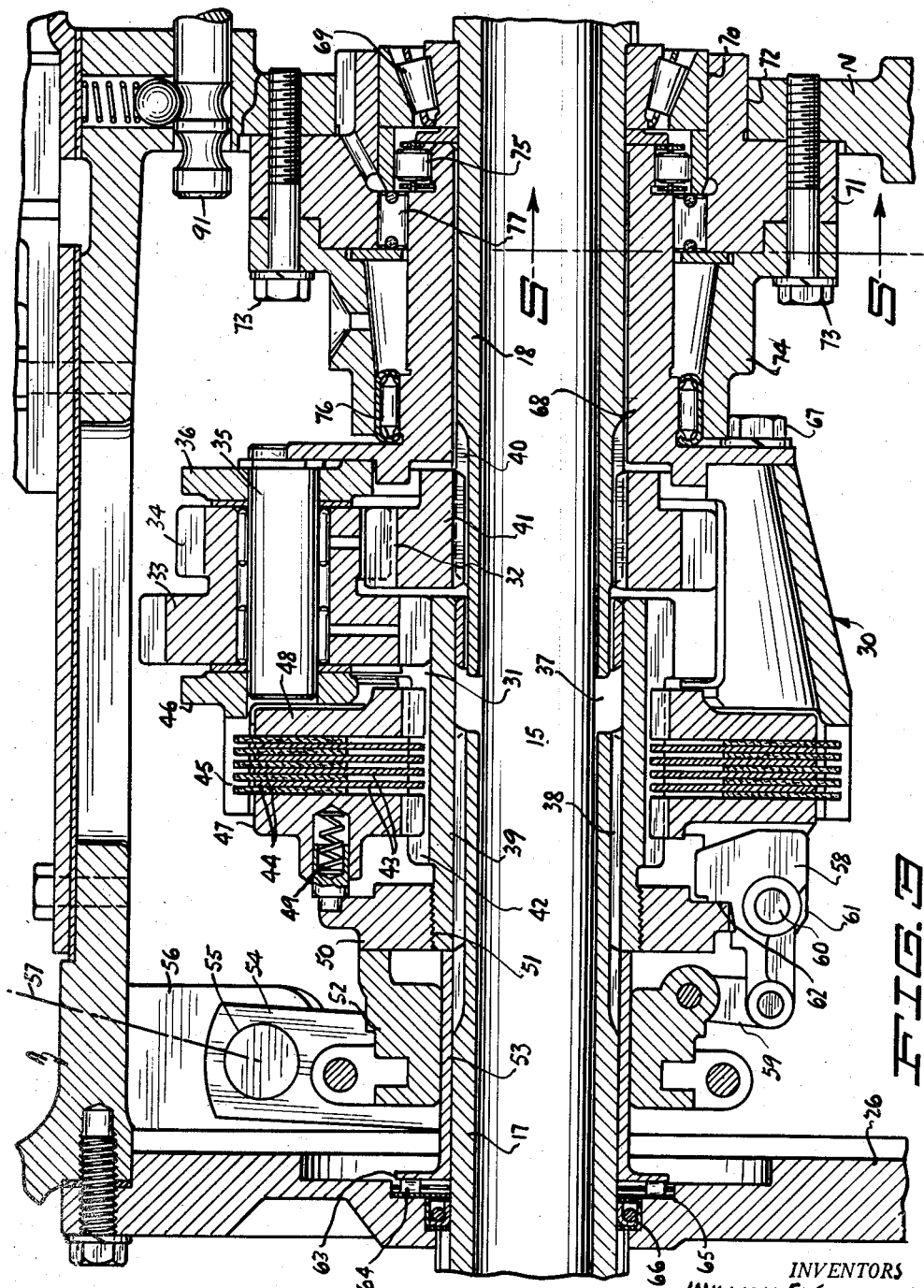

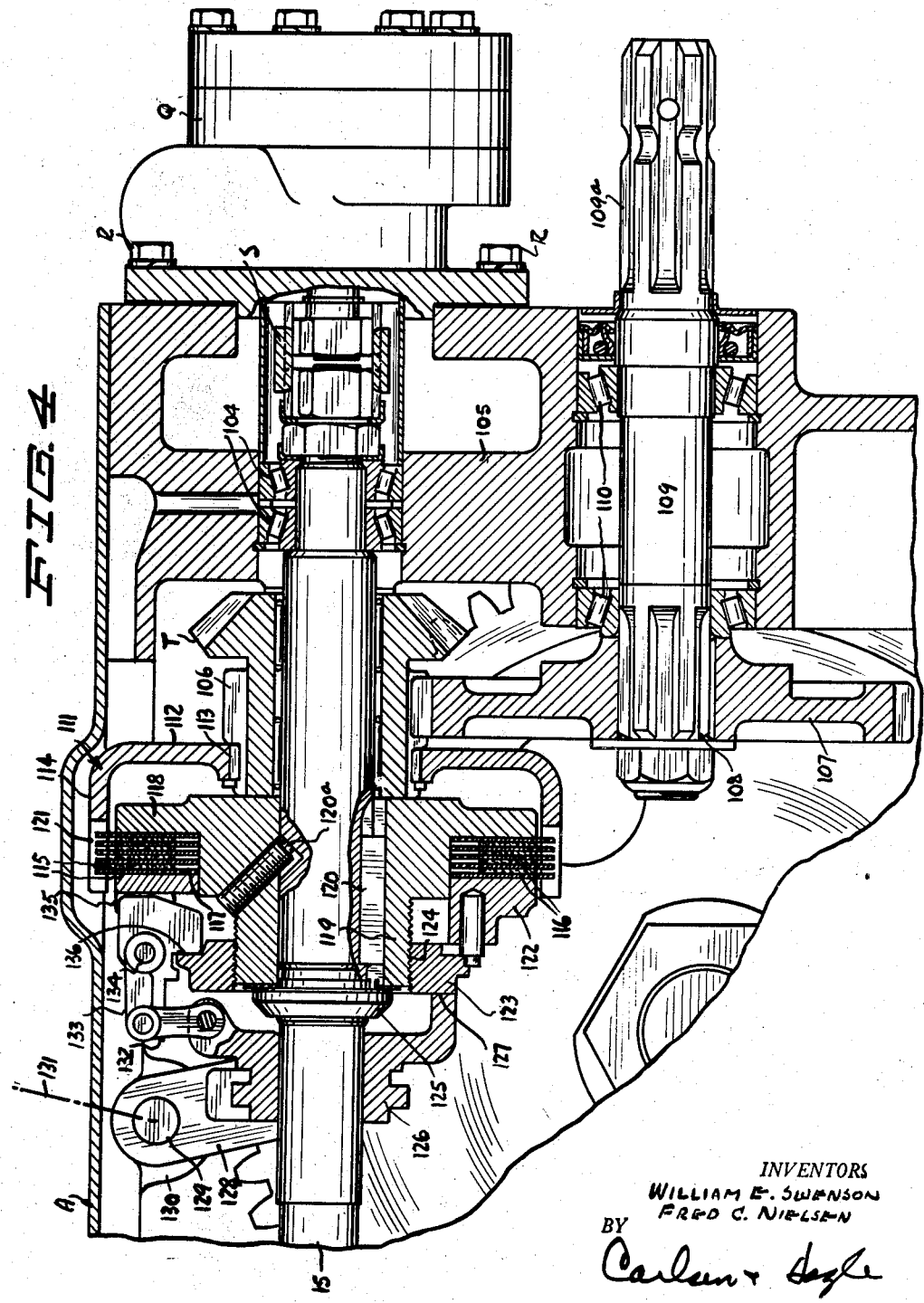

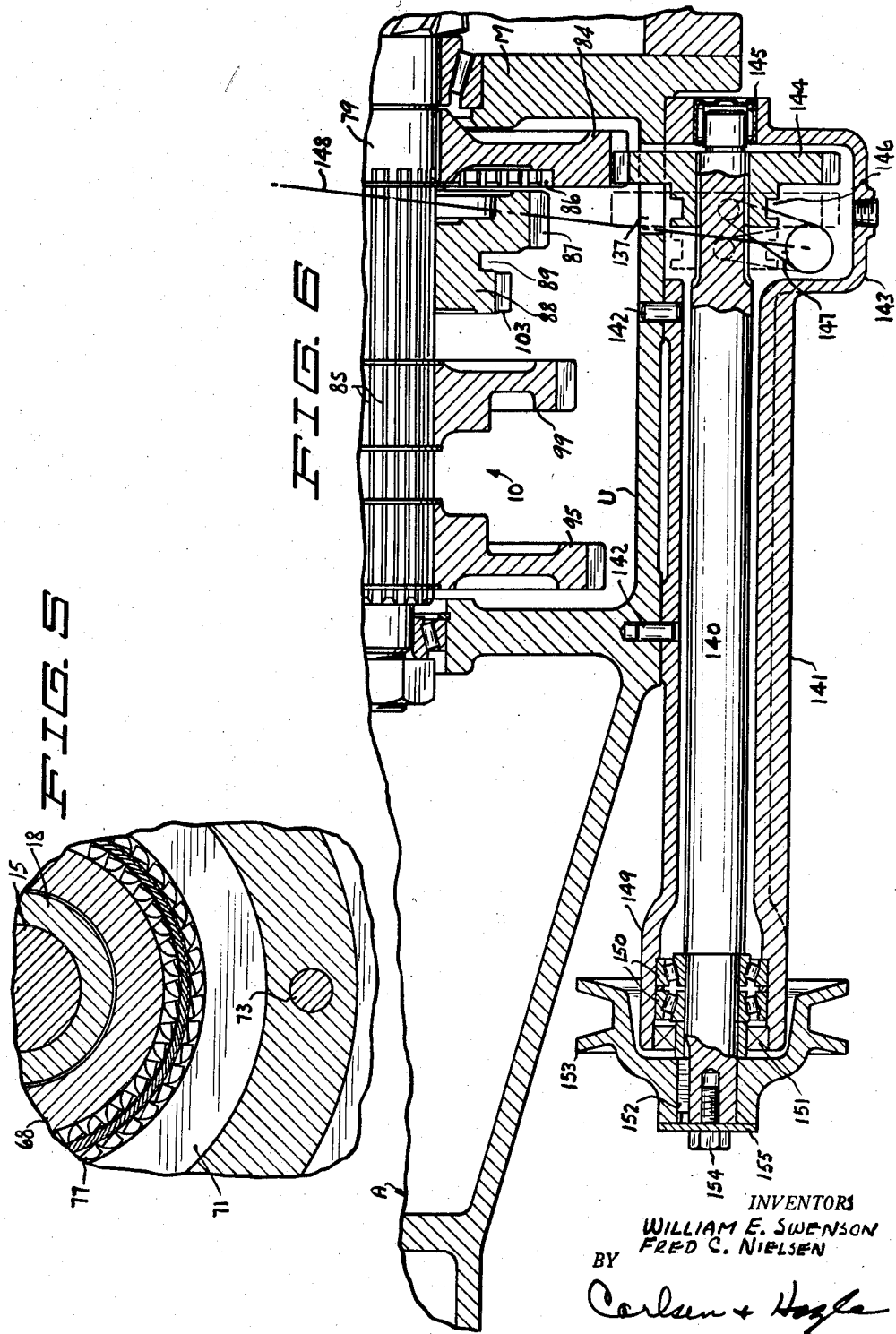

2,838,940

TRACTOR TRANSMISSION WITH PLURAL POWER TAKE-OFF SHAFTS

William E. Swenson and Fred C. Nielsen, St. Paul, Minn., assignors to Minneapolis-Moline Company, Hopkins, Minn., a corporation of Minnesota Application March 23, 1956, Serial No. 573,374

11 Claims. (Cl. 74—15.2)

This invention relates generally to improvements in tractors, and more specifically to improvements in the mechanisms driven by the tractor engine and operating to supply propulsion to the traction wheels of the tractor as well as torque for the operation of various kinds of auxiliary equipment which are customarily attached to the tractor.

The primary object of the invention is to provide general improvements in the mechanisms by which propulsion power and torque are transmitted to the engine including a change speed transmission in conjunction with which is associated a two-speed drive unit acting as a secondary transmission unit or torque amplifier so that for each speed range adjustment of the main transmission the operator has under his control an additional speed range according to the adjustment of said secondary transmission unit. Furthermore, the mechanism of this invention includes at least two power take-off shafts through which torque may be transmitted from the engine for the operation of auxiliary equipment, such as combines, mowers and the like, which are customarily attached to the tractor. In accordance with this object of the invention one of said power take-off shafts is extended rearwardly through the said transmission units and is connected directly to the engine for operation thereby whenever the engine itself is running, but which shaft has associated therewith a clutch by which the torque flow may be separately controlled independently of the clutch controlling operation of the said transmission units and, therefore, independently of the travel movement of the tractor. In addition the second power take-off shaft is, in accordance with this invention, preferably extended in a forward direction for the most convenient operation of implements or equipment which may be mounted on the forepart of the tractor, this shaft being driven through the main transmission unit, and here again there is provided means for selectively controlling the torque flow to this second power take-off shaft. Another object of the invention is to provide an assembly or mechanism of the above character in which the first power take-off shaft extends rearwardly through both of said transmission units to act as a support for components thereof, while the second power take-off shaft is located exteriorly of the housing in which said transmission units are located and is driven from one of the gears going to make up the main transmission unit itself. The exterior location of this second power take-off shaft, as well as its drive from one of the gears of the main transmission unit, makes its use optional on the part of the operator, and the housing and shaft and other components going to make up the second power take-off assembly may be readily mounted upon or dismounted from the transmission housing.

Another object is to provide a mechanism of the foregoing characteristics which is relatively simple and compact in construction and dependable in operation, and which provides a flexibility of control necessary to meet all of the various situations with which the operator may be confronted in the maximum utilization of the tractor in various farm operations.

These and other more detailed and specific objects will be disclosed in the course of the following specification, reference being had to the accompanying drawings, in which—

Fig. 1 is a vertical longitudinal sectional view through a portion of a tractor embodying the present invention, showing the housing structure in section and indicating the relative locations of the engine flywheel and clutch, the main transmission, the two-speed drive or second transmission and the clutch controlling torque flow through the main power take-off shaft, but with these components shown only in outline due to the small scale in which they appear in this view. Also appearing in this view are portions of the tractor itself, such as the operator's seat and one of the rear traction wheels.

Fig. 2 is an enlarged vertical and longitudinal sectional view of the forepart of the structure shown in Fig. 1 including the engine flywheel and clutch, the two transmission units and related components and also showing the second power take-off shaft mounted upon the housing and driven by the main transmission unit.

Fig. 3 is a still further enlarged vertical and longitudinal sectional view through the second transmission unit or two-speed drive unit for the main transmission.

Fig. 4 is a vertical and longitudinal sectional view at about the same scale as that of Fig. 3 and illustrating the output shaft which is driven by the main power take-off shaft along withe the control clutch therefor.

Fig. 5 is an enlarged fragmentary diametrical sectional view taken substantially along the line 5—5 in Fig. 3 and showing the one-way or overrunning type of clutch which is associated with the second transmission unit or two-speed drive unit.

Fig. 6 is an enlarged fragmentary vertical and longitudinal sectional view through the lower part of the structure shown in Fig. 2 and particularly bringing out the manner in which the second power take-off shaft is mounted and driven.

Referring now more particularly and by reference characters to the drawing A designates generally a housing forming the central chassis portion of a tractor, portions of which are designated generally at B, including an operator's station C and one of the two rear traction wheels D. The tractor, of course, has the usual engine, a portion of the crankcase of which appears at E, and to the rear flanged end of which the housing assembly A is bolted in the usual fashion. The engine, of course, includes a crankshaft, a fragment of which is designated at F in Fig. 2, secured on which is a flywheel G. The housing A comprises a forward portion H wherein the transmission components are located and a rear portion I in which the usual differential mechanism J and drive gears K for the traction wheels are mounted, these two portions being bolted together where their flanged ends meet at L. The forward portion H of the housing A includes a rear wall M and a central wall N which are spaced apart to accommodate therebetween the main change speed transmission unit, designated generally at 10, and forwardly of the wall N there is a forward wall O spaced rearwardly from the crankcase E providing space for the accommodation of the usual manually operative engine clutch, designated generally at 11. As is best seen in Fig. 2 the clutch 11 comprises cooperating clutch disks 12 acting between the flywheel G and a clutch ring 13 and normally influenced by clutch springs 14 to transmit torque from the flywheel to the said ring. A main power take-off shaft 15 is splined at its forward end 16 into the hub portion of the flywheel G and extends rearwardly therefrom through the walls O, N and M of said housing A, it being obvious that this splined connection between the shaft and flywheel causes the former to be rotated whenever the tractor engine is in operation. The shaft 15 supports front and rear hollow shafts 17 and 18, independently rotatable on the shaft 15, and at its forward end the shaft 17 is splined at 19 into the hub 20 of the engine clutch 11 so that whenever said clutch is engaged, as it normally is, then torque will be transmitted from the engine to the shaft 17. Slidably mounted upon the shaft 17, immediately to the rear of the clutch 11, is a clutch operating collar 21 carrying an anti-friction bearing 22 at its forward end adapted for engagement with conventional clutch opening levers 23 which act, upon forward movement of the collar 21, to overcome the clutch springs 14 and free the clutch disks 12 to break torque flow from the engine to the shaft 17, as will be readily understood.

The shifting motion of the collar 21 may be carried out in any usual manner and for convenience there is here shown only a diagrammatical representation at 24 of a manual control lever, although in the usual instance this lever will be a part of linkage extending rearwardly to the usual foot pedal (not shown) with which most tractors are provided, and this lever operates collar 21 by the usual shipper lever 21ª. A torsional return spring 25 is also designated in Fig. 2, the same being connected to a plate 26 bolted at 27 in a large opening 28 in the wall O and having an end hooked into a lug 29 at the rear of the collar 21 in order to normally bias the collar rearwardly toward a position clearing the aforesaid levers 23.

The space between the walls N and O accommodates a two-speed drive unit or torque amplifier, designated generally at 30, which in effect functions as a second change speed transmission unit for driving the main change speed transmission unit 10 at two different speeds. This unit 30 is best shown in Fig. 3 and the same comprises a planetary gear system having sun gears 31 and 32 cooperating with planet gears 33 and 34, the latter being rotatably carried upon pins 35 in a planetary carrier or cage 36. The two hollow shafts 17—18 terminate short of meeting, as indicated at 37, just forwardly of these cooperating planetary gears and at its rear end the shaft 17 is splined at 38 into a hollow sleeve 39 upon the rear end of which is formed the gear teeth going to make up the sun gear 31. The forward end of the shaft 18 is likewise splined at 40 into the hub 41 of the sun gear 32 so that the planetary gear system joins the two shafts 17—18. The exterior of the sleeve 39 also carries splines 42 by which the sleeve is non-rotatably associated with a series of clutch disks 43 interleaved between similar disks 44, the outer edges of which are splined at 45 into the forward portion 46 of the cage 36. These interleaved clutch disks 43—44 are disposed between clutch rings 47 and 48 fitted at their inner edges to the splines 42 and normally the clutch disks are held engaged by the action of a series of clutch springs, one of which appears at 49, positioned in cavities formed in the forward clutch ring 47 and bearing against a collar 50 threaded at 51 on the forward end of the sleeve 39.

A clutch operating collar 52 is slidably mounted on a thrust sleeve 53 surrounding the shaft 17 forwardly of the collar 50 and this collar 52 is shiftable in a forward direction to disengage the clutch 43—44 by means of a shipper lever 54 pivotally suspended at 55 from a lug 56 in the upper part of the housing A. Here again there is diagrammatically shown a hand lever at 57 for operation of the shipper lever 54. Cam levers, one of which appears at 58, are connected by links 59 to the operating collar 52 and the levers are fulcrumed at 60 upon lugs 61 projecting forwardly from the clutch ring 47. As the collar 52 moves forwardly the levers 58 have a forward camming action at 62 upon the collar 50 to move the same forwardly the slight distance necessary to free the clutch disks 43—44. The thrust sleeve 53 is flanged at its forward end at 63 (Fig. 3) and the flange bears on rollers 64 in a recess 65 in the plate 26 around the opening 66 through which the shaft 17 passes thus to take up the endwise thrust present when the clutch is cammed forward to its open position.

Bolted as seen at 67 to the rear end of the cage 36 is a hub 68 surrounding the shaft 18 and extending rearwardly to an anti-friction bearing 69 which supports the shaft where it passes through the housing wall N. Said bearing 69 is carried in a cylindrical recess 70 in a bearing collar 71 which projects through an opening 72 in the wall N and held in place against said wall by a series of cap screws 73 which screws also mount a forwardly projecting hollow shell 74. Anti-friction bearings 75 and 76 rotatably support the hub 68 at spaced points for rotation independently of the shaft 18. An overrunning or one-way clutch 77 of any conventional form is located between the collar 71 and the hub 68 and limits rotation of the hub to one direction.

Turning now to Fig. 2, the main transmission unit 10 is very similar to that shown in Swenson Patent No. 2,660,900, issued December 1, 1953, and provides five different output speeds for a given engine speed. The hollow shaft 18 extends rearwardly to and is journaled at its rear end in an antifriction bearing 78 in the rear housing wall M. A countershaft 79 is supported in anti-friction bearings 80—81 in the walls N and M and serves as the output shaft from the transmission, this shaft having at its rear end a bevel gear 82 driving the differential J. Forwardly of the bearing 78 the shaft 18 has teeth forming a low speed drive gear 83 which is in constant mesh with a low speed driven gear 84 rotatably mounted upon the rear end portion of the countershaft. Forwardly of the gear 84 the countershaft 79 is splined for its full length as indicated at 85 and the forward face of the gear 84 has internal gear teeth 86 for selective engagement with the teeth 87 of a shiftable gear 88 splined on the countershaft having a peripheral groove 89 for a shipper fork (not shown) but forming part of a gear shifting mechanism, designated generally at 90, located above the main transmission unit. This mechanism 90 is of conventional construction including shifter rods 91 and a gear shift lever 92 (Fig. 1) located convenient to the operator's station C.

At the forward end of unit 10 there is a second speed drive gear 93 slidably splined on the shaft 18, as at 94, and shiftable forwardly from its normal position of Fig. 2 by said mechanism 90 to mesh with a second speed driven gear 95 splined on the forward end of the countershaft 79. The gear 93 also has teeth 96 adapted, when the gear is shifted rearwardly, to mesh with internal teeth 97 on a third speed drive gear 98 rotatably mounted on the shaft 18 and in constant mesh with a third speed driven gear 99 splined on the countershaft 79. A fourth speed drive gear 100 is rotatably and axially shiftably mounted on the shaft 18 and when shifted rearwardly from the position of Fig. 2 has internal teeth 101 to mesh with the aforesaid gear 83 and thus cause torque to be transmitted from the shaft 18 to the gear 100. The gear 100 meshes with the teeth 87 on the aforesaid shiftable gear 88. A fifth speed drive gear 102 is keyed at 102ª to the shaft 18, between the gears 98 and 100, and when the gear 88 is shifted forwardly from the position seen in Fig. 2 this gear 102 meshes with the teeth 103 on the gear 88.

Thus it will be seen that by properly shifting the gears 88, 93 and 100, torque may be transmitted from the shaft 18 to the countershaft 79 at five different speed ratios, the ratio being lowest when the gears 83—84 transmit the torque and growing progressively greater as gears 93—95, 98—99, 100—88 and 102—88 are brought into proper mesh. It is not believed that further explanation of the operation should be necessary herein and it will be clear that the gears 88, 93 and 100 all serve not only as gears but as clutches so that only the gears selected to transmit torque at any given time will be effective, the remainder merely idling until called upon.

The shaft 18 normally rotates at engine speed since with the clutch 43—44 engaged the entire planetary gear system, cage 36 and other components of the second transmission or drive unit 30 rotate in unison and the shafts 17 and 18 are connected one-to-one. At any speed adjustment of the unit 10, however, the effective output speed may be changed merely by disengaging the clutch 43—44 whereupon torque flows from the shaft 17 to shaft 18 through the sun gear 31, the planet gears 33 and 34 and the sun gear 32. Preferably the ratio of these gears to each other is such that the speed of the shaft 18 drops when the clutch 43—44 is disengaged since this will have the effect of lowering the speed but increasing the torque supplied to unit 10 and thence for the propulsion of the tractor. In any event, the combination of the two transmission units 10 and 30 provides no less than ten different forward speeds so that the tractor can meet practically any working conditions. The tendency of the planetary cage 36 and its hub 68 to back rotate as torque is transmitted through the planetary gears is prevented by the one-way clutch 77, as will also be readily understood.

The shaft 15 extends rearwardly beyond the transmission unit 10 to a point near the rear end P of the housing A and referring now to Fig. 4 the extremity of this shaft is journaled in anti-friction bearings 104 carried in a cast bearing structure 105 formed on the housing end at its upper, inner portion. A drive gear 106 is journaled on the shaft 15 forwardly of the bearings 104 and meshes with a driven gear 107 secured at 108 to the forward end of a short countershaft 109 journaled out rearwardly from the housing end through a series of anti-friction bearings 110. The projecting rear end 109a of this countershaft 109 serves as the actual power take-off connection from which torque is taken from shaft 15 for operation of various kinds of auxiliary equipment and implements (not shown), this end 109a having the usual splines, etc., for fitting all power take-off connections on such equipment. It is desirable, however, to control torque flow to the shaft 109 and for this purpose a clutch, designated generally at 111, is provided, the same being largely identical to the clutch previously described and controlling the transmission or drive unit 30. The clutch 111 comprises a cage 112 the rear end of which is splined at 113 to the drive gear 106 and which has a forwardly directed cylindrical wall 114 within which are a series of interleaved clutch disks 115—116. The disks 115 are splined at 117 to a clutch core 118 the hub 119 of which is keyed at 120 and further secured by a set screw 120a to the shaft 15 while the disks 116 are splined at their outer edges to the wall 114 as indicated at 121. A clutch ring 122 bears against the forward side of the group of clutch disks 115—116 and compresses them against the clutch core 118 so that torque will flow from the shaft 15 through the core 118, the disks 115—116, cage 112 and splines 113 to the drive gear 106 and thence out through the shaft 109. A collar 123 is threaded at 124 upon the forward end of the clutch core hub 119 and the clutch assembly thus far described is held against axial displacement between the hub of the gear 106 and a smalelr collar 125 on the shaft 15.

This clutch 111 is completed by a shifting collar 126 slidable on the shaft 15 and bearing at 127 on collar 123, said collar 126 being movable forwardly and rearwardly on the shaft by a shipper fork 128 pivoted at 129 upon a lug 130 on the upper part of the housing A. Here again we have diagrammatically shown a hand lever at 131 by which the shipper fork 128 may be swung in a forward-rearward direction. A series of links, one of which appears at 132, connect the collar 126 to cam levers 133 fulcrumed at 134 on lugs 135 extending from the clutch ring 122 and these levers cam at 136 against the collar 123 in such fashion that forward motion of the collar 126 and shipper fork 128 will compress the clutch disks 115—116 and so close the clutch, and vice versa. The operator thus has control of the operation of all auxiliary equipment or implements driven by the shaft 15 by positioning the hand lever 131 (or whatever kind of manual control may be employed) but the operation is entirely independent of both the transmission units 10—30 so that changes of travel speed of the tractor have no bearing.

In Fig. 4 there is also shown any conventional form of fluid pump Q bolted at R to the rear of the housing A and connected by a releasable flexible connection S to the rear end of the shaft 15 for operation thereby. This pump Q is optional equipment and is, of course, used to supply fluid under pressure for power lifts, etc. (not shown) associated with the tractor. Also shown is a bevel gear T on the rear end of the drive gear 106 for driving the usual laterally extending belt pulley shaft (not shown) if one is used.

As is seen in Fig. 1 the bottom U of the housing A has an opening 137 below and in vertical alignment with the low speed driven gear 84 of the main transmission unit 10. This opening 137 may be sealed off by a closure plate 138 bolted at 139 to the housing bottom U but referring to Fig. 6 in detail we also provide a second power take-off shaft 140 and means whereby the same may be driven by the gear 84 through said opening. For this purpose the closure plate 138 is removed and substituted therefor is a hollow and elongated shaft housing designated generally at 141 suitably bolted in place and held against horizontal displacement by dowel pins 142. The housing 141 extends in a fore and aft direction beneath the housing A, forwardly from the main transmission unit 10 and at its rear end has an enlargement 143 to accommodate a gear 144 which is splined upon the rear of the shaft 140, forwardly of an anti-friction bearing 145 which supports the rear extremity of such shaft. The gear 144 has a peripherally grooved hub 146 and is shifted axially along the shaft 140 by a shipper lever 147 manipulated by a suitable hand lever or other manual control, here again diagrammatically designated by a line 148. When shifted rearwardly the gear 144, projecting upward through the opening 137, is moved into mesh with the gear 84 which as aforesaid is constantly rotated whenever transmission unit 10 is clutched to the engine while when shifted forwardly the gear 144 clears gear 84 thus controlling torque transmission to the shaft 140.

The forward end of the housing 141 is also slightly enlarged at 149 to receive anti-friction bearings 150 through which the forward end of the shaft 140 projects, there being a suitable dust and oil seal 151 around this end of the shaft. Forwardly of the seal the projecting end of the shaft 140 has a keyway 152 to which is keyed a belt pulley or analogous means 153 for taking power from the shaft, the same being held against axial displacement off the shaft by a cap screw 154 and washer 155. The pulley 153 (or sprocket etc.) is thus adapted to the operation of auxiliary equipment in addition to that powered by shaft 15 and is particularly suited to the operation of front mounted mowers or other implements on the forepart of the tractor.

From the foregoing it will be apparent that we have provided by our invention an exceedingly flexible change speed propulsion mechanism for a tractor as well as means for the operation of all auxiliary equipment with which the tractor may be provided. The main transmission unit 10 provides for five forward speeds, under control of the engine or main clutch 11 while at any such speed adjustment the second transmission unit 30 enables the operator to drop to a lower speed, while increasing torque and without stopping the tractor under control of the manual control member 57. This is of particular importance when the tractor is pulling equipment which may have a tendency to clog or bog down when heavy crop or bad land is encountered and where such equipment is also operated from the power take-off shaft 15 the change of travel speed may be accomplished without interruption of torque flow through said shaft. On the other hand, the clutch 111 permits the torque flow to the power take-off connection 109ª to be controlled at any time, merely by positioning the control element 131. Forwardly positioned implements or equipment may be driven by the second power take-off shaft 140 under control of the control element 143.

The mechanism throughout is relatively simple, compact and straightforward in design. Durability and serviceability of the design has been constantly in mind, as for example note the adjustment of the threaded clutch collars 50 and 123 which permit wear on the clutches to be taken up as time goes on. The shaft 15 not only serves as the primary power take-off drive but also supports, in conjunction with the various associated bearings, the transmission unit 30 and the drive gear series of the transmission unit 10.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a tractor having an engine, mechanism for transmitting propulsion power from the engine and also supplying torque therefrom along at least two separate paths for the operation of auxiliary equipment by the tractor, said mechanism comprising a change speed transmission unit having cooperating gear trains of different speed ratios for transmitting propulsion power from the engine, means including a manually operative clutch for selectively connecting said change speed transmission to the engine, a first shaft connected to and driven by the engine independently of said cluch and transmission unit and constituting one of said paths along which torque is transmitted for operating auxiliary equipment, and a second shaft and means operatively connecting the same to one of the gear trains of said transmission unit for operation as the second path for supplying torque for operation of auxiliary equipment.

2. In a tractor having an engine, mechanism for transmitting propulsion power from the engine and also supplying torque therefrom along at least two separate paths for the operation of auxiliary equipment by the tractor, said mechanism comprising a main housing and change speed transmission unit therein having cooperating gear trains of different speed ratios for transmitting propulsion power from the engine, means including a manually operative clutch for selectively connecting said change speed transmission to the engine, a first shaft connected to and driven by the engine independently of said clutch and transmission unit and constituting one of said paths along which torque is transmitted for operating auxiliary equipment, a second shaft and means operatively connecting the same to one of the gear trains of said transmission unit for operation as the second path for supplying torque for operation of auxiliary equipment, a shaft housing for said second shaft and removably mounted upon the exterior of said main housing along said transmission unit.

3. In a tractor having an engine, mechanism for transmitting propulsion power from the engine and also supplying torque therefrom along two separate paths for the operation of auxiliary equipment by the tractor, said mechanism comprising in combination, a change speed transmission unit having cooperating gear trains of different speed ratios for transmitting propulsion power from the engine, means including a manually operative clutch for connecting said change speed transmission to the engine, a first shaft connected to and driven by the engine independently of said clutch and transmission unit and extending rearwardly through said unit to constitute one of said paths along which torque is transmitted for operating auxiliary equipment, and a second shaft and means connecting the same to one of the gear trains of said transmission unit for operation as the second path for supplying torque for operation of auxiliary equipment, the said second shaft extending forwardly from the transmission unit.

4. In a tractor having an engine, mechanism for transmitting propulsion power from the engine and also supplying torque therefrom along two separate paths for the operation of auxiliary equipment by the tractor, said mechanism comprising in combination, a change speed transmission unit having cooperating gear trains of different speed ratios for transmitting propulsion power from the engine, means including a manually operative clutch for connecting said change speed transmission to the engine, a first shaft connected to and driven by the engine independently of said clutch and extending rearwardly therefrom and constituting one of said paths along which torque is transmitted for operating auxiliary equipment, a second shaft and means connecting the same to one of the gears of said transmission unit for operation as the second path for supplying torque for operation of auxiliary equipment, the said first and second shafts being positioned on parallel axes, and separate manually operative and relatively remotely located clutch means for controlling torque flow through said first and second shafts.

5. In a tractor having an engine, mechanism for transmitting propulsion power from the engine and also supplying torque therefrom along two separate paths for the operation of auxiliary equipment by the tractor, said mechanism comprising in combination, a change speed transmission unit having a housing and cooperating gear trains of different speed ratios for transmitting propulsion power from the engine, means including a manually operative clutch for selectively connecting said change speed transmission to the engine, a first shaft extending rearwardly from and driven by the engine independently of said clutch and transmission unit and constituting one of said paths along which torque is transmitted for operating auxiliary equipment, a second shaft and means connecting the same to one of the gear trains of said transmission unit for operation as the second path for supplying torque for operation of auxiliary equipment, the said second shaft extending forwardly from said transmission unit, and a housing for said second shaft removably mounted upon the housing of said transmission unit.

6. In a tractor having an engine, mechanism for transmitting propulsion power from the engine and also supplying torque therefrom along two separate paths for the operation of auxiliary equipment by the tractor, said mechanism comprising in combination, a change speed transmission unit having a housing and cooperating gear trains of different speed ratios for transmitting propulsion power from the engine, means including a manually operative clutch for selectively connecting said change speed transmission to the engine, a first shaft extending rearwardly from and driven by the engine independently of said clutch and transmission unit and constituting one of said paths along which torque is transmitted for operating auxiliary equipment, a second shaft and means connecting the same to one of the gear trains of said transmission unit for operation as the second path for supplying torque for operation of auxiliary equipment, the said second shaft extending forwardly from said transmission unit, a housing for said second shaft removably mounted upon the housing of said transmission unit, and a drive element for a flexible drive member secured upon the forward end of said second shaft.

7. For a tractor, a change speed propulsion assembly and a power take-off assembly having at least two separate paths for transmitting torque for operation of auxiliary equipment by the tractor, said assemblies comprising in combination, an engine clutch, a main change speed transmission unit located rearwardly of said clutch and having gear trains of different speed ratios for transmitting propulsion power from the engine, a rearwardly extending first power take-off shaft connected to the engine independently of the engine clutch and constituting one of said paths for transmitting torque from the engine to auxiliary equipment, a second change speed transmission unit operatively connecting the engine clutch to said main transmission unit, a main housing for said clutch and transmission units, a manual control for said second transmission unit for selectively transmitting high speed low torque or low speed high torque power from the engine clutch to the main transmission unit, said first power take-off shaft extending rearwardly entirely through both the main and second change speed transmission units and operating completely independently of both said units, a second power take-off shaft constituting the said second path for torque transmission from the engine for operation of auxiliary equipment, means selectively connecting the second power take-off shaft to one of said gear trains in the main transmission unit for operation thereby, a shaft housing removably mounted on said main housing exteriorly thereof, and said second power take-off shaft being journaled in said shaft housing.

8. For a tractor, a change speed propulsion assembly, and a power take-off assembly having at least two separate paths for transmitting torque for operation of auxiliary equipment by the tractor, said assemblies comprising an engine clutch, a main change speed transmission unit located rearwardly of said clutch and having change speed gear trains of different speed ratios for transmitting propulsion power from the engine, a rearwardly extending first power take-off shaft connected to the engine independently of the engine clutch and constituting one of said paths for transmitting torque from the engine for operation of auxiliary equipment, a second change speed transmission unit operatively connecting the engine clutch to said main transmission unit for selectively transmitting high speed low torque or low speed high torque power from the engine clutch to the main transmission unit, said first power take-off shaft extending rearwardly through both the main and second change speed transmission units, front and rear hollow shafts telescoped over the said first power take-off shaft and operatively connected by the said second transmission unit, the front hollow shaft being also operatively connected to the engine clutch and the rear hollow shaft being operatively connected to drive the gear trains in the main transmission unit, an overrunning clutch limiting rotation of the rear hollow shaft to one direction, a second power take-off shaft constituting the said second path for torque transmission from the engine for operation of auxiliary equipment, and means selectively connecting the second power take-off shaft for operation by one of said change speed gear trains in the main transmission unit.

9. In a tractor, a combined change speed propulsion mechanism and power take-off mechanism having at least two separate paths for transmitting torque for operation of auxiliary equipment, comprising a manually controlled engine clutch, a main change speed transmission unit located rearwardly of said clutch and having change speed gear trains of different speed ratios for transmitting propulsion power from the engine, a rearwardly extending first power take-off shaft connected to the engine independently of the engine clutch and constituting one of said paths for transmitting torque from the engine to auxiliary equipment, a second change speed transmission unit operatively connecting the engine clutch to said main transmission unit, a manual control for said second transmission unit for transmitting high speed low torque or low speed high torque power from the engine clutch to the main transmission unit, said first power take-off shaft extending rearwardly through both the main and second change speed transmission units, front and rear hollow shafts telescoped over the said first power take-off shaft and connected by the said second transmission unit, a front hollow shaft being also operatively connected to the engine clutch and the rear hollow shaft being operatively connected to drive the gear trains in the main transmission unit, the said rear hollow shaft extending rearwardly substantially entirely through the main transmission unit, a housing for the transmission units, an overrunning clutch limiting rotation of the rear hollow shaft to one direction, a second power take-off shaft constituting the second path for torque transmission from the engine for operation of auxiliary equipment, and a sliding gear acting as a drive and a clutch for selectively connecting the second power take-off shaft to one of said change speed gear trains in the main transmission unit.

10. In a tractor, a combined change speed propulsion mechanism and power take-off mechanism having at least two separate paths for transmitting torque for operation of auxiliary equipment, comprising a manually controlled engine clutch, a main change speed transmission unit located rearwardly of said clutch and having gear trains of different speed ratios for transmitting propulsion power from the engine, a rearwardly extending first power take-off shaft connected to the engine independently of the engine clutch and constituting one of said paths for transmitting torque from the engine to auxiliary equipment, a second change speed transmission unit operatively connecting the engine clutch to said main transmission unit, a manual control for said second transmission unit for transmitting high speed low torque or low speed high torque power from the engine clutch to the main transmission unit, said first power take-off shaft extending rearwardly through both the main and second change speed transmission units, front and rear hollow shafts telescoped over the said first power take-off shaft and connected by the said second transmission unit, the front hollow shaft being also operatively connected to the engine clutch and the rear hollow shaft being operatively connected to drive the gear trains in the main transmission unit, the said rear hollow shaft extending rearwardly substantially entirely through the main transmission unit, a transmission housing for the transmission units, an overrunning clutch limiting rotation of the rear hollow shaft to one direction, a second power take-off shaft constituting the said second path for torque transmission from the engine for operation of auxiliary equipment, means selectively connecting the second power take-off shaft to one of said gear trains in the main transmission unit, and a housing for the second power take-off shaft and secured to the underside of said transmission housing and extending forwardly from the main transmission unit.

11. In a tractor having an engine, mechanism for transmitting propulsion power from the engine and also supplying torque therefrom along at least two separate paths for the operation of auxiliary equipment by the tractor, said mechanism comprising a main housing and change speed transmission unit therein having cooperating gear trains of different speed ratios for transmitting propulsion power from the engine, means including a manually operative clutch for selectively connecting said change speed transmission to the engine, a first shaft connected to and driven by the engine independently of said clutch and transmission unit and constituting one of said paths along which torque is transmitted for operating auxiliary equipment, a second shaft and means operatively connecting the same to one of the gear trains of said transmission unit for operation as the second path for supplying torque for operation of auxiliary equipment, said main housing having an opening exposing one of the gear trains of said change speed transmission, a shaft housing secured to the exterior of the main housing about said opening and communicating therewith, means rotatably supporting the said second shaft in the shaft housing with one end of the shaft exposed therefrom, and a gear on said second shaft selectively meshing with the exposed gear train of the transmission through said opening in the main housing.

References Cited in the file of this patent

UNITED STATES PATENTS

| | | |
|---|---|---|
| 2,140,687 | Brown | Dec. 20, 1938 |
| 2,168,033 | Johnston | Aug. 1, 1939 |
| 2,211,413 | Ford | Aug. 13, 1940 |
| 2,237,322 | West | Apr. 8, 1941 |
| 2,287,279 | Stumpf | June 23, 1942 |
| 2,448,622 | Dale | Sept. 7, 1948 |
| 2,448,822 | Pinardi | Sept. 7, 1948 |
| 2,601,297 | Keese | June 24, 1952 |
| 2,725,963 | Fletcher | Dec. 6, 1955 |